United States Patent
Hutchison et al.

(10) Patent No.: US 7,761,621 B2
(45) Date of Patent: *Jul. 20, 2010

(54) EMBEDDED VIRTUAL SERIAL PORT

(75) Inventors: David J. Hutchison, Rochester, MN (US); Adam D. Dirstine, Rochester, MN (US); Pamela A. Wright, Rochester, MN (US); Jeffrey M. Ryan, Byron, MN (US)

(73) Assignee: Digi International Inc., Minnetonka, MN (US)

( * ) Notice: Subject to any disclaimer, the term of this patent is extended or adjusted under 35 U.S.C. 154(b) by 329 days.

This patent is subject to a terminal disclaimer.

(21) Appl. No.: 11/532,067

(22) Filed: Sep. 14, 2006

(65) Prior Publication Data

US 2008/0126072 A1   May 29, 2008

(51) Int. Cl.
*G06F 3/00* (2006.01)
*G06F 13/12* (2006.01)
*G06F 15/16* (2006.01)

(52) U.S. Cl. ............................ 710/62; 710/5; 710/15; 710/67; 710/73; 709/217; 709/227

(58) Field of Classification Search ................ 710/62, 710/5, 15, 67, 73; 709/217, 227
See application file for complete search history.

(56) References Cited

U.S. PATENT DOCUMENTS

| 6,047,319 | A | 4/2000 | Olson | |
|---|---|---|---|---|
| 2006/0059336 | A1* | 3/2006 | Miller et al. | 713/165 |
| 2007/0005867 | A1* | 1/2007 | Diamant | 710/306 |

* cited by examiner

*Primary Examiner*—Niketa I Patel
(74) *Attorney, Agent, or Firm*—Schwegman, Lundberg & Woessner, P.A.

(57) ABSTRACT

A system comprising a communication (COM) port server that, together with a COM port client, establishes COM port redirection over a network and communicates data with a serial port, at least one embedded application which is configured to communicate data via a serial port, and at least one virtual serial port application communicatively coupled to the embedded application and the COM port server. The virtual serial port application translates data communicated between the COM port server and the embedded application as if the COM port server and the embedded application were connected by a serial communication link.

25 Claims, 4 Drawing Sheets

EMBEDDED VIRTUAL SERIAL PORT

TECHNICAL FIELD

This document relates generally to devices and systems that communicate via a network and in particular to communication among applications over the network.

BACKGROUND

Computers communicate with other computers and with peripheral devices. FIG. 1 shows a block diagram of a host computer 105 and an end device 110 such as a printer for example. In the example shown, a host application 115 communicates with an end device application 120 over a serial communication link 125. Both the host computer 105 and the end device communicate over the serial communication link 125 using serial ports 128, 132 and serial port drivers 130, 135 to control communications over serial ports 128 and 132.

Sometimes it can be difficult to connect an end device 110 directly to a host computer. This may be because the distance between the end device 110 and the host computer 105 is too great, or because host computer 105 lacks the serial ports needed to connect to the end device 110. In such situations, system designers often turn to a device server. Device servers allow a host computer to communicate with devices. An example is shown in FIG. 2. Typically, the devices are connected by serial communication lines 222 to one or more device servers 220 and an application running on a host computer 212 communicates with the serial devices over the network 210 using the device server 220. More than one host computer 212 can communicate over the network 210 with the same device connected to the device server 220.

To manage the devices, device servers are configured to accommodate the various device types. As the number of different types of devices connected through networks increases, network configurations can quickly become complicated.

SUMMARY

This document describes both devices and methods used to manage devices on a computer network. One system embodiment includes a communication (COM) port server that, together with a COM port client, establishes COM port redirection over a network and communicates data with a serial port, at least one embedded application which is configured to communicate data via a serial port, and at least one virtual serial port application communicatively coupled to the embedded application and the COM port server. The virtual serial port application translates data communicated between the COM port server and the embedded application as if the COM port server and the embedded application were connected by a serial communication link.

One method embodiment includes establishing COM port redirection software, emulating at least one COM port connection to the COM port server on the communications device, and emulating a serial port driver on the communications device. Establishing COM port redirection software includes initiating a COM port client on a host computer and a COM port server on a communications device, emulating at least one COM port connection includes storing data received from the host computer in a buffer, and emulating a serial port driver includes taking data from the buffer and translating the data into a predefined format such that at least one embedded application executing on the communication device communicates with the COM port client using the emulated serial port.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
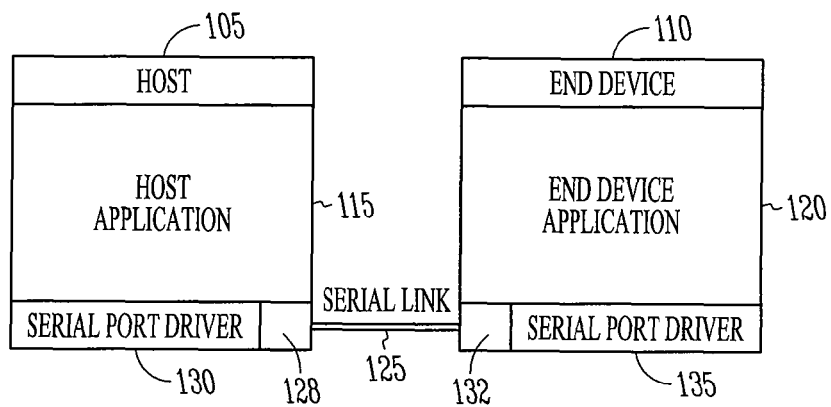
FIG. 1 shows a block diagram of a host computer and an end device.
Figure 2:
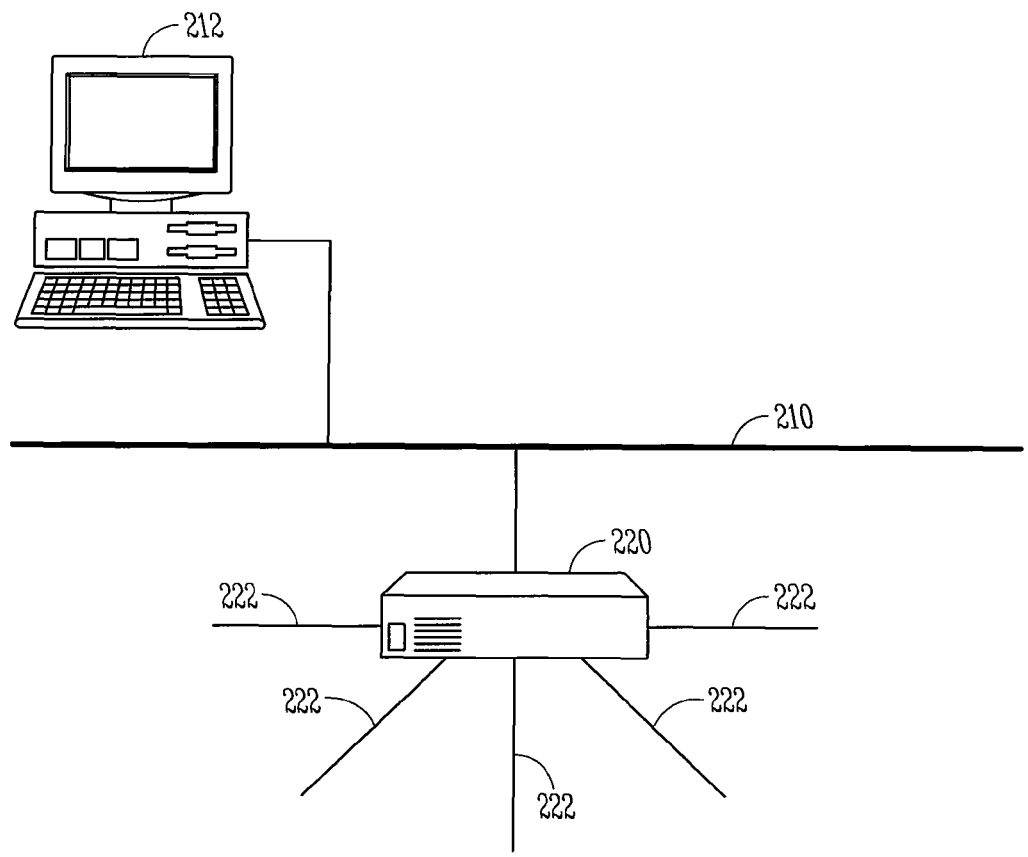
FIG. 2 shows a block diagram of a host computer in communication with a variety of different types of devices using a device server.
Figure 3:
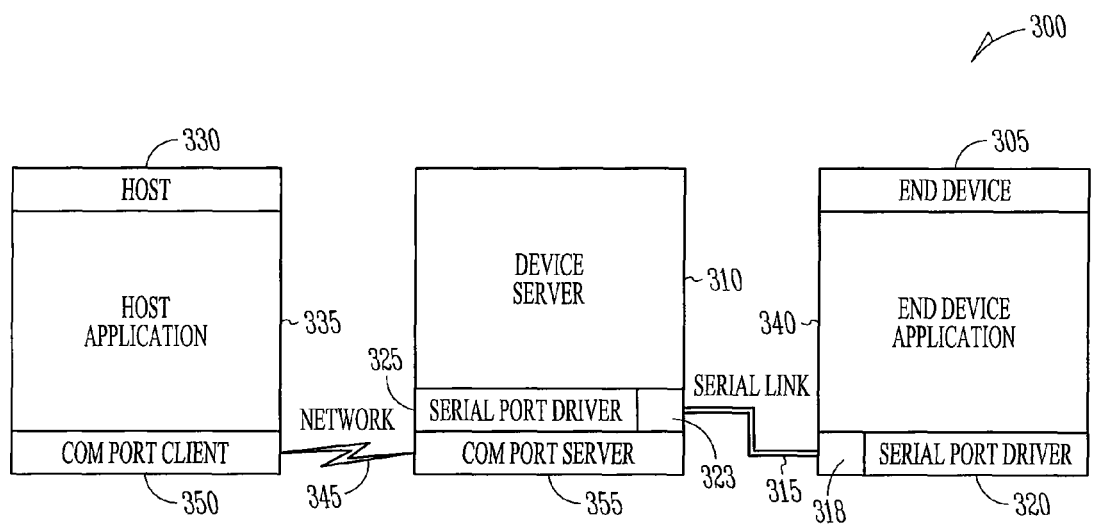
FIG. 3 shows a block diagram of portions of a client-server system that uses serial port redirection.

This document discusses, among other things, systems and methods for communicating data among devices on a network. Devices that communicate serially can be network-enabled by connecting them to a device server and installing a serial driver on a host computer to provide serial port redirection. FIG. 3 shows a block diagram of portions of a client-server system 300 that uses serial port redirection. The system 300 includes an end device 305 coupled to a device server 310 via a serial communication link 315 through serial ports 318, 323. The device server 310 and the end device 305 include serial ports 318, 323 and serial port drivers 320, 325 to control the communications over serial ports 318, 323. The system 300 also includes a host computer 330. A host application 335 that executes on the host computer 330 communicates with an end device application 340 by communicating with the device server 310 over a network 345. To provide serial port redirection, a communication (COM) port client 350 is included in the host computer 330 and a COM port server 355 is included in the device server 310. Serial port data from the host application 335 is sent via the network 345 to the device server 310. From there it is routed directly to the serial port 323 which is connected to the end device 305. The device server 310 typically increases the cost of the system 300 and raises maintenance issues. Also, the end hardware devices can become costly to maintain if the hardware is older, is no longer supported by the original manufacturers, or is in low supply.

Figure 4:
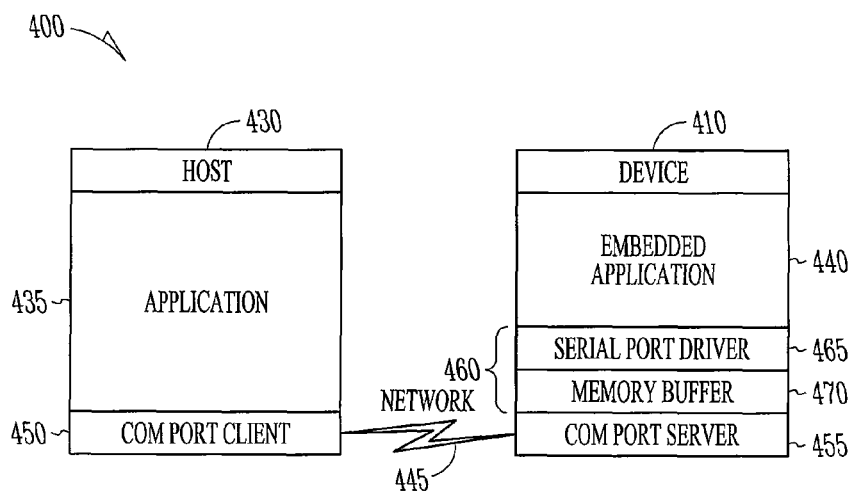
FIG. 4 is a block diagram of portions of a system that includes a host computer and a communications device linked by a network.

FIG. 4 is a block diagram of portions of a system 400 that includes a host computer 430 and a communications device 410 linked by a network 445. It can be seen that the system 400 does not include the device server 310 and the end device 305 of FIG. 3. They have been replaced with the communications device 410. The functionality of an end device is included in an embedded application 440 that executes on the communications device 410. A host application program 435 and the embedded application 440 communicate over the network 445. COM port redirection is established in the system by a COM port client 450 in the host computer 430 and a COM port server 455 in the communications device 410. A COM port client 450 typically maps the network connection directly to a physical serial port on a device server and is tightly coupled to the serial port.

Because it is desirable to allow use of any existing communication protocol and avoid having to create a new communication protocol for the system 400, the embedded application 440 communicates via a serial port. A virtual serial port application 460 is included in the communications device 410 to translate data communicated between the COM port server 455 and the embedded application 440. This translation makes it appear that the COM port server 455 and the embedded application 440 were connected by a serial communication link.

In some embodiments, the virtual serial port application 460 includes a serial port driver 465 in communication with the embedded application 440 and a memory buffer 470. The serial port driver 465 is a pseudo device driver that implements the standard serial device interfaces (e.g., open, read, write, close, etc.). The embedded application 440 interacts with the serial port driver 465 as if it was a standard serial port. However, instead of reading from or writing to a physical device, the serial port driver 465 sends and receives data through a virtual endpoint and the memory buffer 470, then to the COM port server 455 and over the network 445. Thus, the embedded application uses the same interface to communicate over a physical serial port or a virtual serial port. The COM port client 450 communicates data to the embedded application 440 over the network 445. Serial port data from the host application 435 is sent via the network 445 to the COM port server 455. From there it is routed directly to the memory buffer 470 which is connected to the serial port driver 465 in communication with the embedded application 440.

Because the serial port driver 465 is a pseudo driver, the communications device 410 is flexible in regards to communication protocols. The serial communication protocol used by the COM port server 455 can be different from the serial communication protocol used by the embedded application 440. In one embodiment, the serial port driver 465 and the memory buffer 470 provide a mapping of the protocol use by the embedded application 440 to the protocol of the COM port server 455. Typical serial interface settings such as baud rates, flow control, a number of stop bits, and the like do not need to be configured between the host computer 430 and the other communications device 410. This allows communication between devices and systems that otherwise could not communicate because of serial interface incompatibility.

It should be noted that the system 400 is not a client-server system. In a client-server system, as much processing as possible is offloaded from a device server onto an end device. Here, the communications device 410 includes some characteristics of a client server and some characteristics of the end device.

The host computer 430 includes a COM port client 450 that, together with the COM port server 455 of the communications device, implements COM port redirection. With COM port redirection, it appears to a host application 435 that a serial device connected to the COM port server 455 is local to the host computer 430. Because the communications device 410 includes a virtual serial port application 460, it appears to the host application 435 that an end device is connected locally to the host computer. However, the end device is instead replaced with an embedded application 440.

The COM port client 450 includes a driver to communicate with the COM port server 455 via the network 445. In some embodiments, the driver includes an application programming interface (API) by which the host application program 435 is granted full control of a remote COM port connection including hardware and software flow control. In some embodiments, the network connection between the host computer 430 and the communications device 410 is a bytestream connection, and the network 445 uses a TCP/IP protocol running on top of an Ethernet protocol. In some embodiments, the host computer 430 includes a daemon to execute on the host computer 430. The daemon uses a STREAMS interface to establish a bidirectional bytestream connection between the driver and the communications device 410. An approach for providing communication port redirection is described in U.S. Pat. No. 6,047,319, entitled "Network Terminal Server with Full API Implementation," filed Jul. 17, 1996, which is incorporated herein by reference.

In some embodiments, the communications device 410 includes a plurality of embedded applications 440 that each emulates an end device. In one such embodiment, the host application program 435 communicates with the embedded applications 440 over the network 445 using a plurality of COM port servers 455 and virtual serial port applications 460. The driver of the COM port client 450 maps a plurality of COM ports servers of the communications device 410 to a plurality of virtual serial port applications 460. In another embodiment, the system 400 includes a plurality of communications devices 410 and the COM port client 450 maps a plurality of COM port servers of a plurality of communications devices 410 to a plurality of virtual serial port applications 460.

There does not have to be a one-to-one correspondence between the number of embedded applications 440 that run on the communications device 410 and the number of virtual serial port applications 460. In some embodiments, the communications device 410 includes at least one embedded application 440 that communicates over a plurality of serial ports. A plurality of virtual serial port applications 460 are provided to translate data communicated between a plurality of COM port servers 455 and the embedded application 440. The host application program 435 communicates with the embedded application 440 via a network 445 and the plurality of virtual serial port applications 460.

In some embodiments, the embedded application 440 emulates an application specific display driver and the communications device 410 includes a video port, such as a VGA or SVGA video port, to couple to a display. In one example, the display is an ASCII terminal display. In another example, the display is a vt220 terminal display. A video signal is sent from the communications device 410 to the display. This allows the communications device to implement an application-specific display. Examples of an application specific display include, without limitation, a kitchen display, a point of sale display, a public information display, and a digital advertising display.

Figure 5:
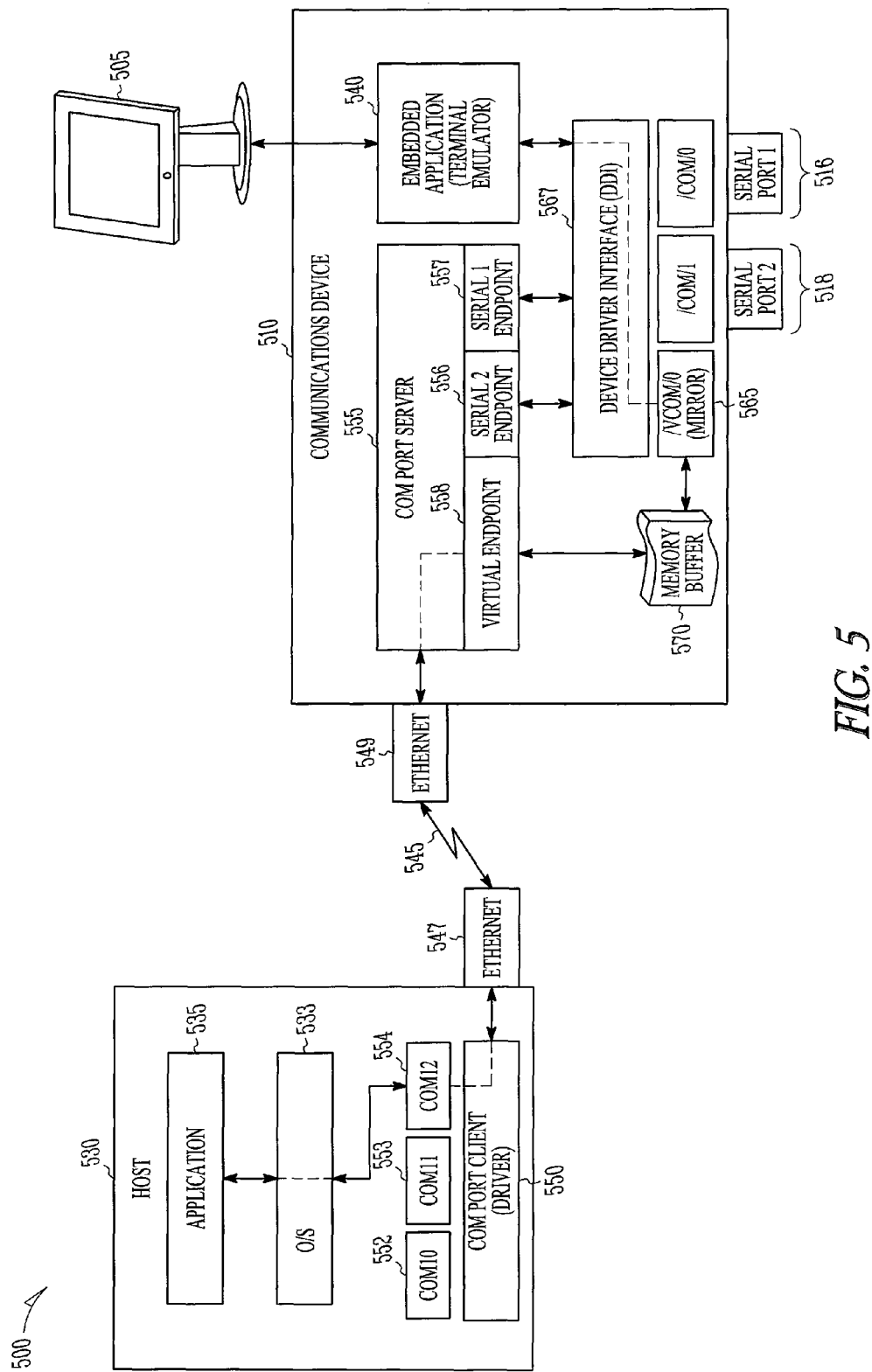
FIG. 5 is a block diagram of portions of an embodiment of a system that includes an application specific display.

A kitchen display is used in a fast food restaurant to display food orders taken at a register. An application running on a host system sends commands to a terminal to display the order on a terminal screen. Typically, the commands are sent over a serial line to the terminal, such as a VT220 terminal for example. An example of portions of an embodiment of a system 500 that includes an application specific display is shown in FIG. 5. The system 500 includes a VGA or LCD display 505 or monitor, a communications device 510, and a host computer 530.

The communications device 510 replaces the VT220 terminal and any device server. The communications device 510 includes two physical serial ports (/com/0 and /com/1) 516, 518 and one virtual serial port (/vcom/0) 565 and device driver interface (DDI) 567. The communications device 510 also includes a COM port server 555 in communication with two serial endpoints 556, 557, and a virtual endpoint 558. A terminal emulator embedded application 540 reads commands from a serial port, processes the commands, and updates the attached display 505. In this case the terminal emulator embedded application 540 is reading from the virtual serial port 565.

The host computer 530 includes an operating system (OS) 533 and a host application 535. The host application 535 sends VT220 display commands to a terminal via a serial port. The host computer includes a COM port client 550 with three virtual COM ports configured for a remote device. The first two virtual COM ports (COM10 and COM11) 552, 553 represent the two physical serial ports 516, 518 on the communications device 510. The third virtual COM port (COM12) 554 represents the virtual serial port 565 on the communications device 510. The host application 535 is configured to send VT220 display commands to the virtual COM port 554. The flow of display commands from the host application 535 to the terminal emulator embedded application 540 on the communications device 510 is indicated by the arrows and dashed lines in the FIG.

The host application 535 sends VT220 commands to the virtual COM port 554 as serial data. The COM port client 550 sends the serial data to the COM port server 555 running on the communications device 510 over the network 545 and the Ethernet connections 547, 549. The COM port client 550 routes the serial data to the virtual endpoint 558. The virtual endpoint 558 puts the serial data in a shared memory buffer 570 and then signals to the virtual serial port driver 565 (a serial port mirror driver) that data is available.

The terminal emulator embedded application 540 continually performs reads on the virtual serial port 565. If data is available in the shared memory buffer 570, the virtual serial port driver 565 removes it from the shared memory buffer 570 and sends it to the terminal emulator embedded application 540. The terminal emulator embedded application 540 processes the commands in the data and displays the orders on the attached VGA or LCD display 505. It then repeats the process by reading more commands. Similarly, data can flow the other way; from the terminal emulator embedded application 540 on the communications device 510 to the host application 535.

Returning to FIG. 4, in some embodiments the embedded application 440 emulates a universal serial bus (USB). This allows a host application program 435, that was written to communicate with a serial port, to communicate with a USB port. For example, suppose that a host application program 435 prints to a serial printer. To replace the serial printer with a USB printer, the communications device 410 includes a USB port. The serial printer data can be redirected to the embedded application 440 on the communications device 410 to convert the serial data stream and communicate with a new USB printer using the USB port. Although a printer was used in the example, the same setup can be used to convert any serial port communication to a USB communication.

In some embodiments, the embedded application 440 emulates one or more serial port drivers. This provides serial port replication. For example, if the host application program 435 prints to a serial printer, the serial data stream can be sent on to the serial printer using the same or a different serial communication protocol. The serial data stream can also be replicated to one or more additional serial ports included with the communications device 410. It also allows the serial data stream to be duplicated to a data traffic logging facility to log the serial data traffic.

In some embodiments, the embedded application 440 emulates a global positioning system (GPS) input-output (I/O) module. Many GPS modules communicate with other devices using a serial data link. A serial data stream being sent from or to an embedded application 440 which is functioning as the GPS I/O module can be redirected over a network 445 to the host application program 435. In some embodiments, the communications device 410 includes a GPS. The GPS communicates with the embedded application 440 which emulates the I/O module.

Figure 6:
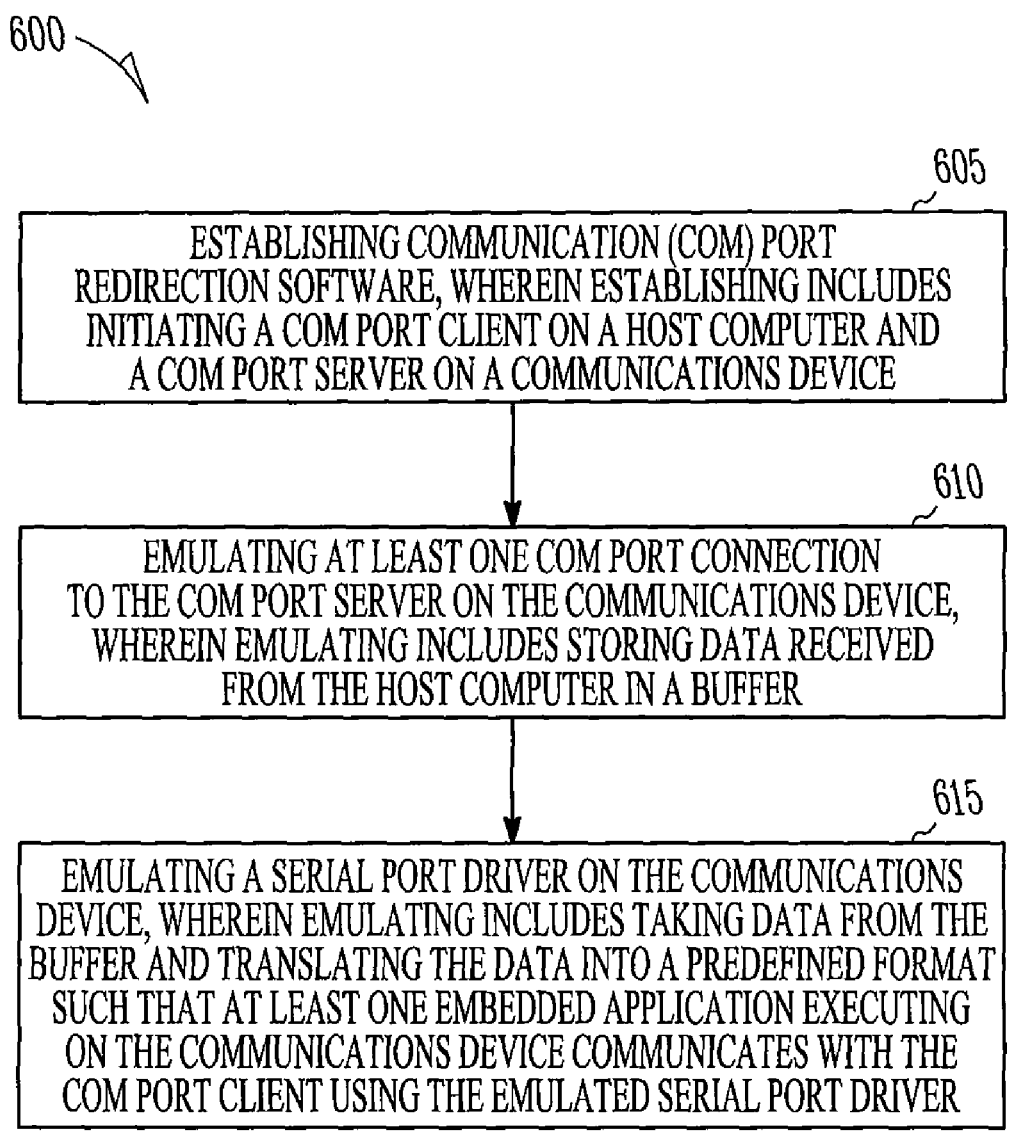
FIG. 6 shows a diagram of an embodiment of a method of communicating data over a computer network.

FIG. 6 shows a diagram of an embodiment of a method 600 of communicating data over a computer network. At 605, the method 600 includes establishing communication (COM) port redirection software. In some embodiments, establishing can include initiating a COM port client on a host computer and a COM port server on a communications device. The COM port server communicates with the COM port client over a network. At 610, the method 600 includes emulating at least one COM port connection to the COM port server on the communications device. In some embodiments, emulating can include storing data received from the host computer in a memory buffer or endpoint.

At 615, the method 600 includes emulating at least one serial port driver on the communications device. The serial port driver is communicatively coupled to the COM port server. In some embodiments, the emulating includes taking data from the memory buffer and translating the data into a predefined format. The data is translated such that at least one embedded application executing on the communications device communicates with the COM port client using the emulated serial port driver.

The COM port server and the embedded application communicate by reading and writing to the memory buffer instead of reading and writing to a physical serial port. The embedded application may communicate using more than one serial port. Thus in some embodiments, the method 600 includes emulating a plurality of serial port drivers on the communications device. The serial port drivers are connected to a plurality of COM port servers. The embedded application communicates data with the application program executing on the host computer over the network using a plurality of emulated COM port connections and emulated serial port drivers. More than one embedded application may execute on the communications device at the same time.

Establishing redirection software allows data from an application program executing on the host computer to be redirected via the network to an emulated COM connection. The network communicatively couples the host computer to the communications device. In some embodiments establishing redirection software includes using a driver that executes in the host computer. In some embodiments, establishing redirection software includes giving the application program full control of the emulated COM port (including hardware and software flow control) using an application programming interface (API). In some embodiments, the method 600 includes establishing a bidirectional bytestream connection over the network between the driver that executes on the host computer and the COM port server on the communications device.

A network can include a host computer communicating with a plurality of additional communications devices over the network. In some embodiments, the method 600 includes emulating at least one COM port connection of a second communications device, redirecting data from an application executing on the host computer via the network to the emulated COM port connection of the second communications device using the driver, and emulating at least one serial port driver on the second communications device in communication with the emulated COM port connection. An embedded application executing on the second communications device communicates with the emulated COM port over the emulated serial port. Data is communicated over the network between the application program on the host computer and the embedded application of the second communications device.

According to some embodiments, the embedded application emulates a hardware device that communicates using a serial port. In some embodiment examples, the emulated hardware device includes an application specific display driver. In some examples, the emulated hardware device includes a universal serial bus (USB). In some examples, the method 600 includes emulating a serial port using the embedded application to provide serial port replication. In some examples, the emulated hardware device includes a GPS I/O module.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations, or variations, or combinations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:

1. An embedded device comprising:
    a communication (COM) port server that, together with a COM port client on a separate device, establishes COM port redirection over a network and communicates data with a serial port;
    at least one embedded application, wherein the embedded application is configured to communicate data via a serial port; and
    at least one virtual serial port application connected between and co-located with the embedded application and the COM port server, wherein the virtual serial port application translates data communicated between the COM port server and the embedded application as if the COM port server and the embedded application were connected by a serial communication link.

2. The system of claim 1, wherein the virtual serial port application includes:
    a serial port driver in communication with the embedded application; and
    a memory buffer in communication with the serial port driver to function as a virtual serial port by storing data received from the serial port driver and the COM port server.

3. The system of claim 1, wherein the embedded application emulates an end device that communicates using a serial port.

4. The system of claim 3, wherein the embedded application emulates an application specific display driver.

5. The system of claim 3, wherein the embedded application emulates a universal serial bus (USB).

6. The system of claim 3, wherein the embedded application emulates one or more serial ports.

7. The system of claim 3, wherein the embedded application emulates a global positioning system (GPS) input-output (I/O) module.

8. The system of claim 1, wherein the embedded application communicates via a serial port using a different serial port communication protocol than the COM port server.

9. A communications system comprising:
    a communications device including:
        a communication (COM) port server that, together with a COM port client located on a separate device, establishes COM port redirection over a network and communicates data with a serial port;
        at least one embedded application, wherein the embedded application is configured to communicate data via a serial port; and
        at least one virtual serial port application connected between and co-located with the embedded application and the COM port server, wherein the virtual serial port application translates data communicated between the COM port server and the embedded application as if the COM port server and the embedded application were connected by a serial communication link; and
    a host computer connected across the network to the communications device, wherein the host computer includes a COM port client having a driver to communicatively couple the host computer to the COM port server on via the network.

10. The system of claim 9, wherein the driver includes an application programming interface (API) by which an application program executing on the host computer is granted full control of a remote COM port including hardware and software flow control.

11. The system of claim 9, wherein a network connection between the COM port client and the COM port server includes a bytestream connection, and wherein the network uses a TCP/IP protocol running on top of an Ethernet protocol.

12. The system of claim 9, including a daemon to execute on the host computer, wherein the daemon uses a STREAMS interface to establish a bidirectional bytestream connection between the driver and the COM port server.

13. The system of claim 9, wherein the driver of the host computer is operable to map a plurality of COM port servers to a plurality of virtual serial port applications.

14. The system of claim 9, wherein the embedded application communicates over a plurality of serial ports, and wherein an application program executing on the host computer communicates with the embedded application via a network and a plurality of virtual serial ports.

15. A method of communicating data over a computer network, the method comprising:
   establishing communication (COM) port redirection software, wherein establishing includes initiating a COM port client on a host computer and a COM port server on a communications device;
   emulating at least one COM port connection to the COM port server on the communications device, wherein emulating includes storing data received from the host computer in a buffer; and
   emulating a serial port driver on the communications device, wherein emulating includes taking data from the buffer and translating the data into a predefined format such that at least one embedded application, co-located and executing on the same communication device as the COM port server and the serial port driver, communicates with the COM port client using the emulated serial port.

16. The method of claim 15, including emulating a hardware device with the embedded application, wherein the hardware device communicates using a serial port.

17. The method of claim 16, wherein emulating a hardware device includes emulating an application specific display driver.

18. The method of claim 16, wherein emulating a hardware device includes emulating a universal serial bus (USB).

19. The method of claim 16, wherein emulating a hardware device includes emulating a serial port.

20. The method of claim 16, wherein emulating a hardware device includes emulating a GPS I/O module.

21. The method of claim 15, further including redirecting data from an application executing on the host computer via the network to the emulated COM port connection using a driver in the host computer.

22. The method of claim 21, wherein redirecting data includes giving an application program, executing on the host computer, full control of the emulated COM port connection using an application programming interface (API) including hardware and software flow control.

23. The method of claim 21, wherein redirecting data includes establishing a bidirectional bytestream connection over the network between the driver on the host computer and the emulated COM port connection.

24. The method of claim 21, including
   emulating a plurality of serial ports on the communications device connected to a plurality of COM ports, such that at least one embedded application executing on the communications device communicates data with the application program executing on the host computer over the network using a plurality of emulated COM port connections and emulated serial ports.

25. The method of claim 21, including
   emulating at least one COM port connection to a COM port server of a second communications device;
   redirecting data from an application executing on the host computer via the network to the emulated COM port connection of the third device using the driver;
   emulating at least one serial port on the second communications device connected to the emulated COM port connection, such that at least one embedded application executing on the second communications device communicates with the emulated COM port connection over the emulated serial port; and
   communicating data between the application program on the host computer and the embedded applications of the communications device and the second communications device over the network to the emulated COM port connections and emulated serial ports.

* * * * *